(12) United States Patent
Dennis et al.

(10) Patent No.: US 7,512,724 B1
(45) Date of Patent: Mar. 31, 2009

(54) MULTI-THREAD PERIPHERAL PROCESSING USING DEDICATED PERIPHERAL BUS

(75) Inventors: Jack B. Dennis, Belmont, MA (US); Sam B. Sandbote, Reston, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1717 days.

(21) Appl. No.: 09/715,772

(22) Filed: Nov. 17, 2000

Related U.S. Application Data

(60) Provisional application No. 60/166,686, filed on Nov. 19, 1999.

(51) Int. Cl.
*G06F 3/00* (2006.01)
*G06F 15/16* (2006.01)

(52) U.S. Cl. .......................... 710/45; 712/21

(58) Field of Classification Search ................ 710/104, 710/107, 113, 60, 62, 64, 106; 709/100, 709/104; 712/1, 21, 234, 28, 32, 206; 718/103
See application file for complete search history.

(56) References Cited

U.S. PATENT DOCUMENTS

| | | | | | |
|---|---|---|---|---|---|
| 4,106,092 | A | * | 8/1978 | Millers, II | 710/64 |
| 4,449,182 | A | * | 5/1984 | Rubinson et al. | 710/60 |
| 5,203,002 | A | * | 4/1993 | Wetzel | 712/21 |
| 5,226,131 | A | * | 7/1993 | Grafe et al. | 712/201 |
| 5,418,917 | A | * | 5/1995 | Hiraoka et al. | 712/234 |
| 5,421,014 | A | * | 5/1995 | Bucher | 709/100 |
| 5,560,029 | A | * | 9/1996 | Papadopoulos et al. | 712/25 |
| 5,812,811 | A | * | 9/1998 | Dubey et al. | 712/216 |
| 5,815,727 | A | * | 9/1998 | Motomura | 712/1 |
| 5,913,059 | A | * | 6/1999 | Torii | 709/104 |
| 5,938,765 | A | * | 8/1999 | Dove et al. | 713/1 |
| 5,951,672 | A | * | 9/1999 | Kwok et al. | 712/28 |
| 5,974,438 | A | * | 10/1999 | Neufeld | 709/104 |
| 6,061,710 | A | * | 5/2000 | Eickemeyer et al. | 718/107 |
| 6,389,446 | B1 | * | 5/2002 | Torii | 709/100 |
| 6,535,936 | B2 | * | 3/2003 | Young | 710/62 |
| 6,772,412 | B2 | * | 8/2004 | Baba et al. | 717/131 |

OTHER PUBLICATIONS

M. Morris Mano, Computer System Architecture, 1982, Prentice-Hall, Inc., 2nd ed., pp. 159-263, 434-443.*
Andrew S. Tanenbaum, Structure Computer Organization, 1990, Prentice-Hall, Inc., 3rd ed., pp. 11-13.*
Anant Agarwal, "Performance Tradeoff in Multithreaded Processors", 1992, IEEE Transactions On parallel andDistributed System, vol. 3, No. 5, pp. 525-539.*

(Continued)

*Primary Examiner*—Khanh Dang
(74) *Attorney, Agent, or Firm*—Sterne, Kessler, Goldstein & Fox PLLC

(57) ABSTRACT

One embodiment of the present invention performs peripheral operations in a multi-thread processor. A peripheral bus is coupled to a peripheral unit to transfer peripheral information including a command message specifying a peripheral operation. A processing slice is coupled to the peripheral bus to execute a plurality of threads. The plurality of threads includes a first thread sending the command message to the peripheral unit.

41 Claims, 7 Drawing Sheets

OTHER PUBLICATIONS

Dean Tullsen, Susan Eggers, and Henry Levy, "Simultaneous Multithreading: Maximizing On-Chip Parallelism", 1995, University of Washington.*

George Daddis and H.C. Torng, "The Concurrent Execution of Multiple Instruction Streams On Superscalar Processors", 1991, Internaltional Conference on Parallel Processing.|*

Anant Agarwal, Beng-Hong Lim, David Kranz, and John Kubiatowicz, "April: A Processor Architecture for Multiprocessing", 1990, IEEE.*

Michael Butler, Tse-Yu Yeh, Yale patt, Mitch Alsup, Hunter Scales, and Michael Shebanow, "Single Instruction Stream Parallelism Is Greater than Two", 1991, University of Michigan and Motorola Inc..*

* cited by examiner

MULTI-THREAD PERIPHERAL PROCESSING USING DEDICATED PERIPHERAL BUS

RELATED APPLICATION

This application claims the benefit of U.S. Provisional Application No. 60/166,686, titled "Integrated Processor for Multithread with Real-Time Input-Output Capability" filed on Nov. 19, 1999.

BACKGROUND

1. Field of the Invention

This invention relates to computer architecture. In particular, the invention relates to multi-thread computers.

2. Description of Related Art

Demand in high speed data transmission has given rise to many large bandwidth network protocols and standards. For example, the Synchronous Optical Network (SONET) has a number of standards used in Wide Area Network (WAN) with speeds ranging from a few megabits per second (Mbps) to several gigabits per second (Gbps). Popular standards include T1 (1.5 Mbps), T3 (45 Mbps), OC-3c (155 Mbps), OC-12c (622 Mbps), OC-48c (2.5 Gbps), OC-192c (10 Gbps), OC-768c (40 Gbps), etc.

In network applications, the requirements for cell processing and packet processing functions at line rates for broadband communications switches and routers have become increasingly difficult to satisfy, and demand multiple processor configurations to meet performance requirements. The processing of cells and packets typically requires frequent interactions with special function devices and external units. Existing techniques are inadequate to meet real-time demands without degrading performance.

Therefore, there is a need to have a technique to perform peripheral operations for cell and packet processing.

BRIEF DESCRIPTION OF THE DRAWINGS

The features and advantages of the present invention will become apparent from the following detailed description of the present invention in which.

DESCRIPTION

Figure 1:
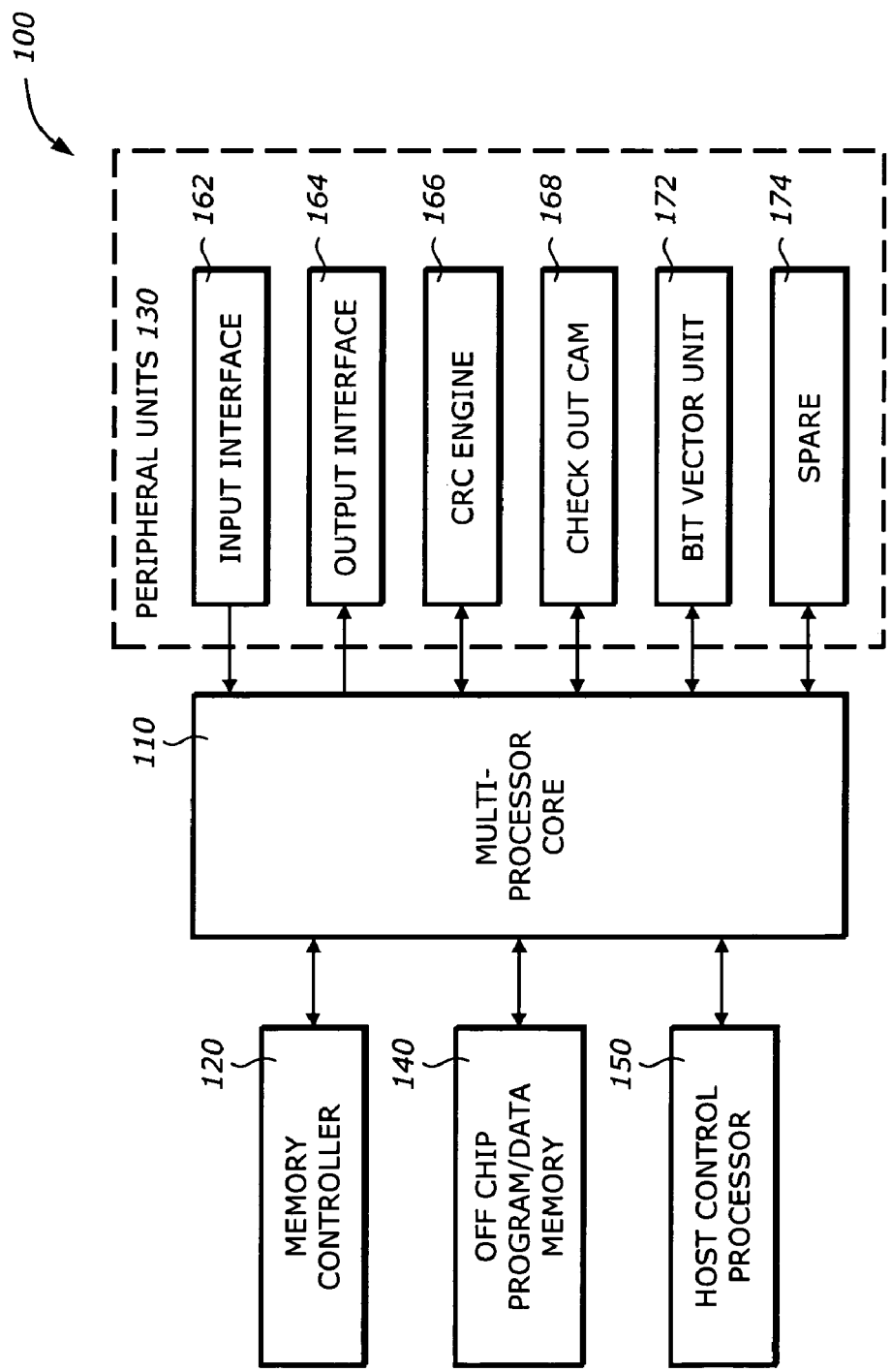
FIG. 1 is a diagram illustrating a system in which one embodiment of the invention can be practiced.

The present invention is a method and apparatus to perform peripheral operations in a multi-thread processor. A peripheral bus is coupled to a peripheral unit to transfer peripheral information including a command message specifying a peripheral operation. A processing slice executes a plurality of threads and is coupled to the peripheral bus to execute peripheral operations. The plurality of threads includes a first thread sending the command message to the peripheral unit.

The command message includes at least one of a message content, a peripheral address identifying the peripheral unit, and a command code specifying the peripheral operation. The peripheral information includes a response message sent from the peripheral unit to the processing slice. The response message indicates the peripheral operation is completed and includes at least one of a thread identifier identifying the first thread, one or more result phrases, each including an operation result, a data register address specifying a data register in the processing slice to store the operation result, and an end flag indicating the last one of the result phrases.

The command message may be a wait instruction or a non-wait instruction. The processing slice disables the first thread after sending the command message if the command message is a wait instruction. The first thread continues to execute after sending the command message if the command message is a non-wait instruction. The processing slice enables the first thread after receiving the response message from the peripheral unit if the first thread was disabled.

The peripheral bus may include a bi-directional bus to transfer the command message from the processing slice to the peripheral unit and the response message from peripheral unit to the processing slice.

The processing slice includes an instruction processing unit, a thread control unit, a peripheral unit, a memory access unit, a functional unit, a condition code memory, and a register file. The processing slice is configured to support execution of a number of threads. Several processing slices operate concurrently in a processor. A multiprocessor core may include several of these processors in a network processor system.

In the processing slice, the instruction processing unit processes instructions fetched from a program memory. The instruction processing unit includes an instruction fetch unit, an instruction buffer, and an instruction decoder and dispatcher. The instruction fetch unit fetches the instructions from the program memory using a number of program counters, each of which corresponds to each of the threads. The instruction buffer holds the fetched instructions waiting for execution. The instruction decoder and dispatcher decodes the instructions and dispatches the decoded instructions to the memory access unit, the functional unit, or the peripheral unit.

The thread control unit manages initiation and termination of at least one of the threads. The peripheral unit transfers the peripheral information between the peripheral unit and the instruction processing unit. The peripheral unit receives command messages from the processing slices to direct performance of peripheral operations and sends response messages to the processing slices to convey results of the peripheral operations to the threads. The memory access unit provides access to one of a number of data memories via a data memory switch. The functional unit performs an operation specified in one of the instructions. The condition code memory stores a number of condition codes, each of which corresponds to each of the threads. The register file has a number of data registers, of which a subset is associated with each of the threads.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

FIG. 1 is a diagram illustrating a system 100 in which one embodiment of the invention can be practiced. The system 100 includes a multiprocessor core 110, a memory controller 120, peripheral units 130, an off-chip program/data memory 140, and a host control processor 150.

The multiprocessor core 110 is a high-performance multi-thread computing subsystem capable of performing all functions related to network operations. These network operations may include adjusting transmission rates, handling special cells and packets used to implement flow control protocols on an individual connection basis, and supporting Asynchronous Transfer Mode (ATM) traffic management for Available Bit Rate (ABR), Variable Bit Rate (VBR), and Unspecified Bit Rate (UBR) connections. The memory controller 120 provides access to additional memory devices and includes circuitry to interface to various memory types including dynamic random access memory (DRAM) and static random access memory (SRAM). The peripheral units 130 include a number of peripheral or input/output (I/O) units for peripheral or I/O operations. The peripheral units 130 include an input interface 162, and output interface 164, a cyclic redundancy code (CRC) engine 166, a check-out content addressable memory (CAM) 168, a bit vector unit 172, and a spare 174. The input and output interfaces 162 and 164 provide interfaces to inbound and outbound network traffics, respectively. These interfaces may include line and switch/system interfaces that support industry standards, including multi-phy features such as Universal Test and Operations PHY Interface for ATM (UTOPIA). The CRC engine 166 supports segmentation and re-assembly for ATM Adaptation Layer Type 5 (AAL5) transmission of packets over ATM connections. The check-out CAM 168 is an associative memory unit that supports the maintenance of several connection records in the on-chip memory for the duration of cell processing for those connections. The bit vector unit 172 supports round-robin scheduling algorithms at the OC-48 line rate.

The off-chip program/data memory 140 includes memory devices that store programs or data in addition to the on-chip programs and data stored in the multiprocessor core 110. The host control processor 150 is a processor that performs the general control functions in the network. These functions may include connection set-up, parameter adjustment, operation monitoring, program loading and debugging support.

Figure 2:
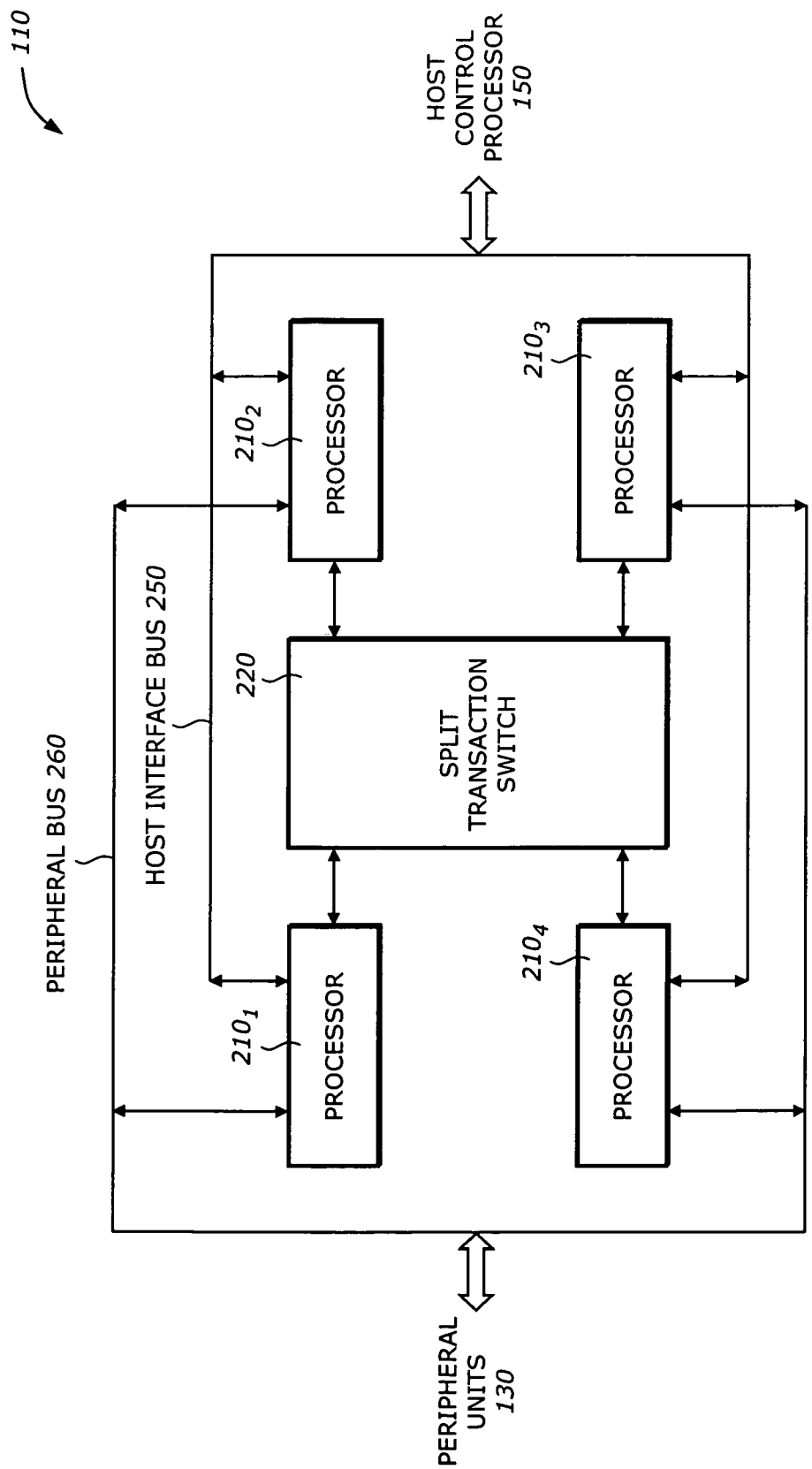
FIG. 2 is a diagram illustrating a multiprocessor core shown in FIG. 1 according to one embodiment of the invention.

FIG. 2 is a diagram illustrating the multiprocessor core 110 shown in FIG. 1 according to one embodiment of the invention. The multiprocessor core 110 includes four multi-thread processors $210_1$ to $210_4$, a split transaction switch 220, a host interface bus 250, and a peripheral bus 260. It is noted that the use of four processors is for illustrative purposes only. As is known to one skilled in the art, any reasonable number of processors can be used.

The four multi-thread processors $210_1$ to $210_4$ are essentially the same. Each of the processors $210_1$ to $210_4$ has local program and data memories for N-bit words of instructions and data, respectively. In one embodiment, N=32. The split transaction switch 210 permits each of the processors to access the data words held in any of the other three data memories with a small additional access time.

The host interface bus 250 allows the any of the four processors $210_1$ to $210_4$ to communicate with the host control processor 150 (FIG. 1). This includes passing parameters, loading program and data, and reporting status. The peripheral bus 260 allows any one of the peripheral units 130 to communicate with any of the processors $210_1$ to $210_4$. Some peripheral units may have direct memory access (DMA) channels to the local data memories of any one of the processors $210_1$ to $210_4$. In one embodiment, each of these channels supports burst transfer of 32-bit data at 100 MHz clock rate, equivalent to greater than the OC-48 speed.

Figure 3:
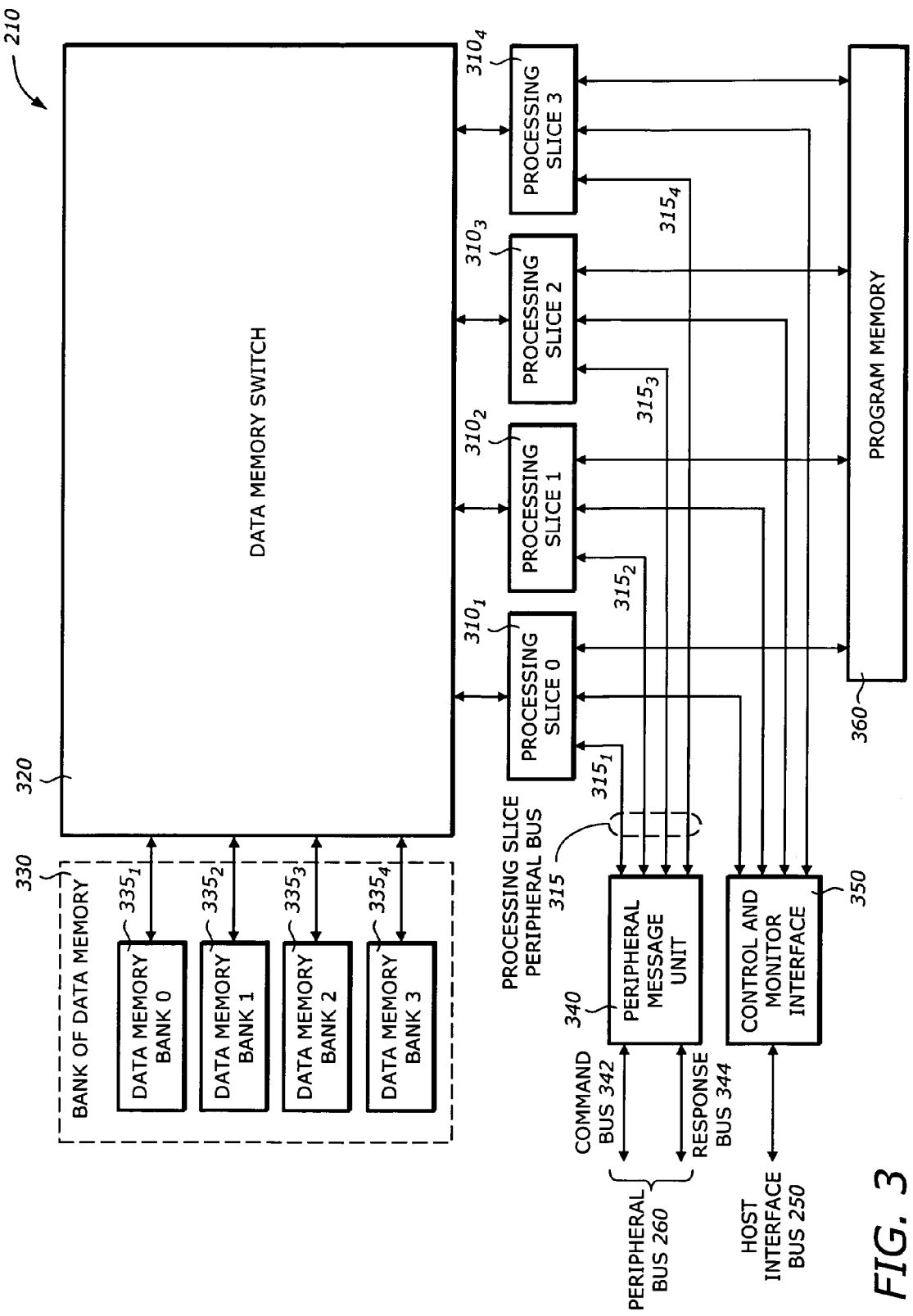
FIG. 3 is a diagram illustrating a multi-threaded processor shown in FIG. 2 according to one embodiment of the invention.

FIG. 3 is a diagram illustrating the multi-thread processor 210 shown in FIG. 2 according to one embodiment of the invention. The multi-thread processor 210 includes four processing slices (PS's) $310_1$ to $310_4$, a data memory switch 320, banks of data memory 330, a peripheral message unit 340, a control and monitor interface 350, and a program memory 360. It is noted that the use of four PS's is for illustrative purposes only. As is known by one skilled in the art, any number of PS's can be used.

The multi-thread processor 210 is a data and/or information processing machine that supports the simultaneous execution of several programs, each program being represented by a sequence of instructions. A thread is a sequence of instructions that may be a program, or a part of a program. The multi-thread processor 210 may have one or more instruction execution resources such as arithmetic logic units, branch units, memory interface units, and input-output interface units. In any operation cycle of the multi-thread processor 210, any instruction execution resource may operate to carry out execution of an instruction in any thread. Any one instruction resource unit may participate in the execution of instructions of different threads in successive cycles of processor operation. To support this mode of operation, the multi-thread processor 210 may have a separate hardware register, referred to as the program counter, for each thread that indicates the position or address of the next instruction to be executed within the thread. A multi-thread multiprocessor is a data and/or information processing system composed of several multi-thread processors.

Each of the PS's $310_1$ to $310_4$ contains a program sequencer and execution units to perform instruction fetch, decode, dispatch and execution for four threads. Each of the PS's operates by interleaving the execution of instructions from the four threads, including the ability to execute several instructions concurrently in the same clock cycle. The data memory switch 320 allows any of the four PS's $310_1$ to $310_4$ to access any data memory bank in the banks of data memories 330. The banks of memories 330 include four banks $335_1$ to $335_4$: data memory banks 0 to 3. Each of the data memory banks $335_1$ to $335_4$ stores data to be used or accessed by any of the PS's $310_1$ to $310_4$. In addition, each of the data memory banks $335_1$ to $335_4$ has an interface to the DMA bus to support DMA transfers between the peripherals and data memory banks. The banks $335_1$ to $335_4$ are interleaved on the low-order address bits. In this way, DMA transfers to and from several of the peripheral units 130 can proceed simultaneously with thread execution without interference.

The four PS's $310_1$ to $310_4$ are connected to the peripheral message unit 340 via four PS buses $315_1$ to $315_4$, respectively. The peripheral message unit 340 is a distribution or switching location to switch the peripheral bus 260 to each of the PS buses $315_1$ to $315_4$. The peripheral message unit 340 is interfaced to the peripheral bus 260 via a command bus 342 and a response bus 344. The command bus 342 and the response bus 344 may be combined into one single bi-directional bus. Appropriate signaling scheme or handshaking protocol is used to determine if the information is a command message or the response message.

When a thread in any of the four PS's $310_1$ to $310_4$ executes a wait or no_wait instruction for a peripheral operation, a command message is sent from the issuing PS to the command bus 342. The command message specifies the peripheral unit where the peripheral operation is to be performed by including the address of the peripheral unit. All peripheral units connected to the peripheral bus 260 have an address decoder to decode the peripheral unit address in the command message. When a peripheral unit recognizes that it is the intended peripheral unit for the peripheral operation, it will decode the command code contained in the command message and then carry out the operation. If the command message is a wait message instruction, the issuing thread is stalled for an interval during which the responding peripheral unit carries out the peripheral operation. During this interval, the resources associated with the issuing thread are available to other threads in the issuing slice. In this way, high resource utilization can be achieved. If it is a no_wait instruction, the issuing thread continues executing its sequence without waiting for the peripheral operation to be completed. The issuing thread may or may not need a response from the peripheral unit.

The control and monitor interface 350 permits the host control processor 150 to interact with any one of the four PS's $310_1$ to $310_4$ through the host interface bus 350 to perform control and monitoring functions. The program memory 360 stores program instructions to be used by any one of the threads in any one of the four PS's $310_1$ to $310_4$. The program memory 360 supports simultaneous fetches of four instruction words in each clock cycle.

Figure 4:
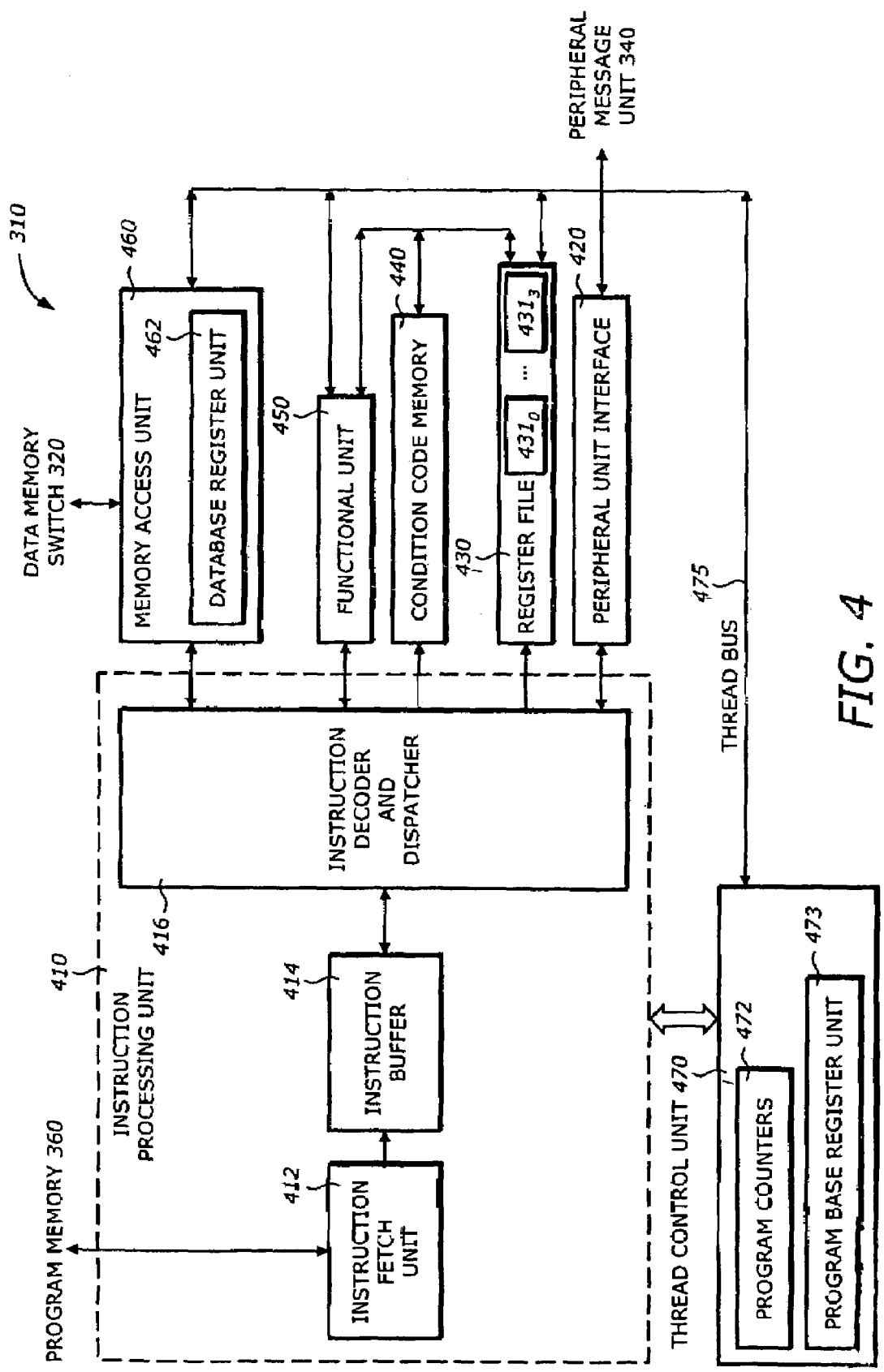
FIG. 4 is a diagram illustrating a processing slice shown in FIG. 3 according to one embodiment of the invention.

FIG. 4 is a diagram illustrating the processing slice 310 shown in FIG. 3 according to one embodiment of the invention. The processing slice 310 includes an instruction processing unit 410, a peripheral unit interface 420, a register file 430, a condition code memory 440, a functional unit 450, a memory access unit 460, and a thread control unit 470. The processing slice 310 is configured to have four threads. The use of four threads is for illustrative purposes only. As is known by one skilled in the art, any number of threads can be used.

The instruction processing unit 410 processes instructions fetched from the program memory 360. The instruction processing unit 410 includes an instruction fetch unit 412, an instruction buffer 414, and an instruction decoder and dispatcher 416. The instruction fetch unit 412 fetches the instructions from the program memory 360 using a plurality of program counters. Each program counter corresponds to each of the threads. The instruction buffer 414 holds the fetched instructions waiting for execution for any of the four threads. The instruction decoder and dispatcher 416 decodes the instructions and dispatches the decoded instructions to the peripheral unit 420, the register file 430, the condition code memory 440, the functional unit 450, or the memory access unit 460 as appropriate.

The thread control unit 470 manages initiation and termination of at least one of the four threads. The thread control unit 470 includes program counters 472 and a program (or code) base register unit 473 containing program base addresses corresponding to the threads. Execution of a computation may start from a single thread, executing the main function of the program. A thread may initiate execution of another thread by means of a start instruction. The new thread executes in the same function context as the given thread. In other words, it uses the same data and code base register contents. A thread runs until it encounters a peripheral wait, or until it reaches a quit instruction.

The peripheral unit interface 420 is connected to the instruction processing unit 410 and the peripheral message unit 340 to transfer the peripheral information between the peripheral units 130 (FIG. 1) and the instruction processing unit 410. The peripheral operation may be an input or an output operation. In one embodiment, an input or output operation is initiated by a message instruction that causes a command message to be transferred to a specified peripheral unit over the peripheral bus. The message instruction may be marked wait or no_wait. If the message instruction is marked wait, it is expected that the peripheral unit will return a response message; the processing slice that issued the message-wait instruction will execute the following instructions of that thread only when the response message has been received over the peripheral bus.

In a peripheral operation, a command message includes a content part that contains data words from data registers specified in the message instruction. If a response message is returned, it contains one or more result phrases, each specifying a data word and a data register identifier; the slice puts each data word in the specified data register, and continues execution of the thread after processing the last result phrase.

The register file 430 has four sets of data registers 431. Each of the four sets of data registers corresponds to each of the four threads. The data registers store data or temporary items used by the threads. Peripheral operations may reference the data registers in the command or response message.

The condition code memory 440 stores four condition codes. Each of the condition codes corresponds to each of the four threads. The condition code includes condition bits that represent the conditions generated by the functional unit 450. These condition bits include overflow, greater_than, equal, less_than conditions. The condition bits are set according to the type of the instruction being executed. For example, the compare instructions sets the greater_than, equal, and less_than condition bits and clears the overflow condition bit.

The functional unit 450 performs an operation specified in the dispatched instruction. The functional unit 450 performs all operations of the instruction set that manipulate values in the data registers. These operations include arithmetic and logical register operations, shift and selected bit operations. The operation performed by the functional unit 450 is determined by a decoded opcode value passed from the instruction decoder and dispatcher 416. The functional unit 450 has connections to the condition code memory 440 to set a thread's condition code according to the outcome of an arithmetic operation or comparison.

The memory access unit 460 provides for read and write accesses to any of the four data memory banks $315_1$ to $315_4$ via the data memory switch 320 (FIG. 3). The memory access unit 460 has a base register unit 462 having four base registers to receive the base address used in address formation and for saving and restoring the base registers for the call and return instructions. Each of the four data base registers corresponds to each of the four threads.

In one alternative embodiment of the invention, the instruction processing unit 410 may include M program base registers. Each of the M program base registers is associated with each of the M threads. The contents of a base register are added to the contents of the corresponding program counter to determine the location in the program memory from which the next instruction for the corresponding thread is to be fetched. An advantage of this scheme is that the branch target specified in the instruction that transfers control may be represented in fewer bits for local transfers.

In one alternative embodiment of the invention, the memory access unit 460 may include a data base register unit 462 having M data base registers 462. Each of the M data base registers is associated with each of the M threads. The contents of the appropriate base register are added to the corresponding program counter to form the effective address for selected instructions. This permits offset addressing to be used, leading to more compact programs.

Figure 5A:
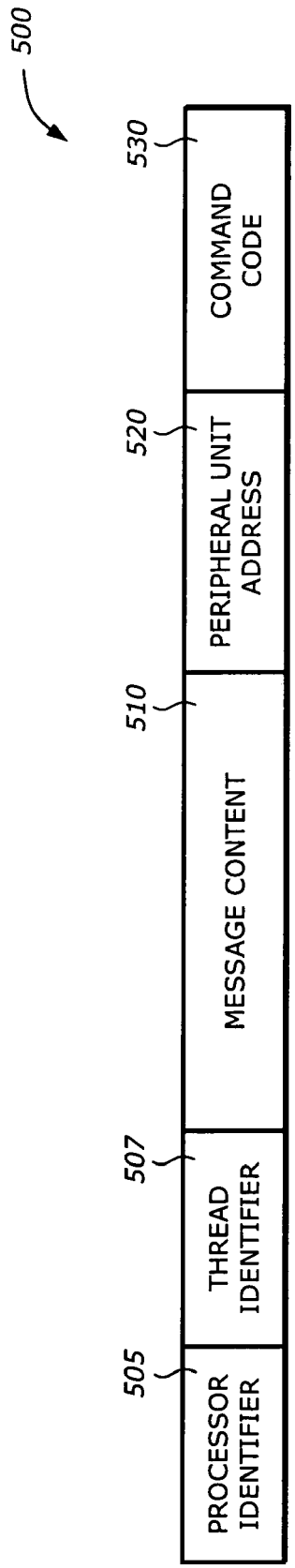
FIG. 5A is a diagram illustrating format of a command message according to one embodiment of the invention.

FIG. 5A is a diagram illustrating format of a command message 500 according to one embodiment of the invention. The command message 500 includes a processor identifier 505, a thread identifier 507, a message content 510, a peripheral address 520, and a command code 530.

The processor identifier 505 and the thread identifier 507 identifies the thread in the processor that issues the command so that the peripheral unit can direct a resulting response message to the correct processor and thread. This is necessary to allow peripheral units to be shared by threads executing on distinct processors.

The message content 510 is a sequence of N-bit words taken from the data registers specified in the message instruction. The message content 510 includes the data or operand to be used by the peripheral unit. For a DMA operation, the message content 510 may contain the starting address for the transfer in data memory, and a count indicating the number of words to be transferred. The peripheral address 520 specifies the address of the peripheral unit to perform the peripheral operation specified by the command code 530. The command code 530 specifies the peripheral operation performed by the peripheral unit corresponding to the address specified in the peripheral address 520.

Figure 5B:
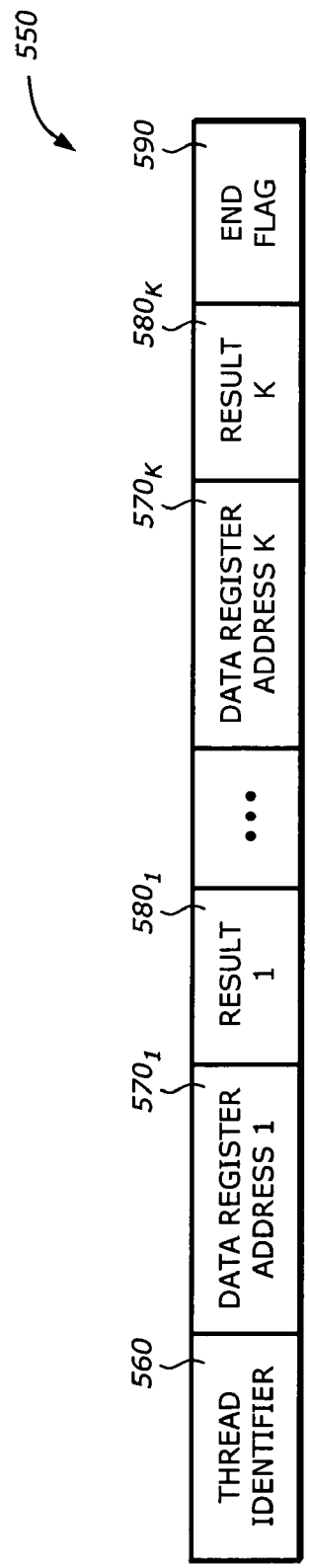
FIG. 5B is a diagram illustrating format of a response message according to one embodiment of the invention.

FIG. 5B is a diagram illustrating format of a response message 550 according to one embodiment of the invention. The response message 550 includes a thread identifier 560, K data register address $570_1$ to $570_K$, K operation result $580_1$ to $580_K$, and an end flag 590.

The thread identifier 560 specifies the thread that the response message is directed to. Usually, this thread is the thread that issued the command message to the peripheral unit. Each of the data register addresses $570_1$ to $570_K$ specifies the data register in the register file 430 to store the corresponding one of K operation results $580_1$ to $580_K$. Each of the operation results $580_1$ to $580_K$ is the result of the corresponding operation, which may include status information regarding the peripheral operation. The end flag 590 indicates the end of the response message 550.

Figure 6:
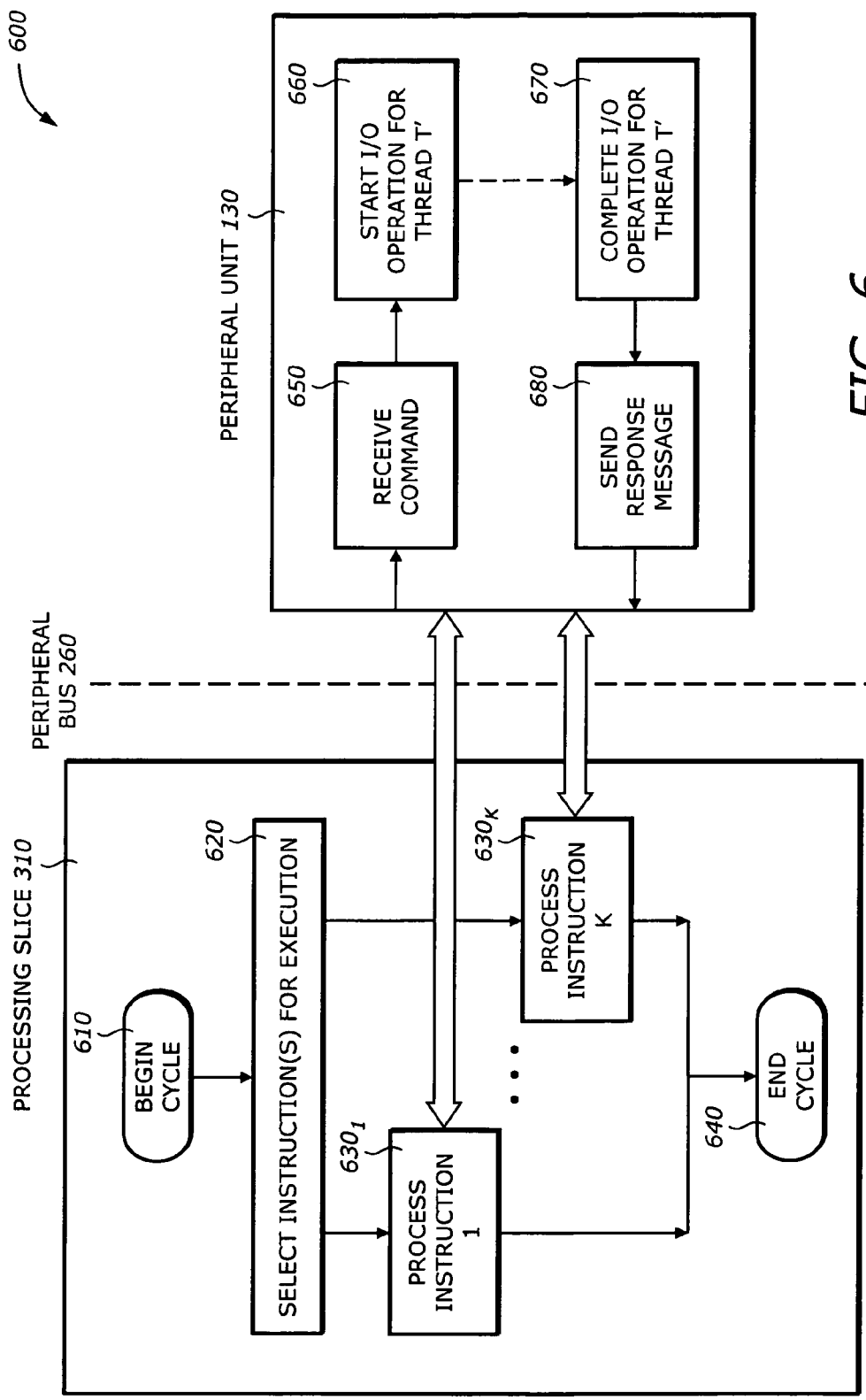
FIG. 6 is a diagram illustrating peripheral operations according to one embodiment of the invention.

FIG. 6 is a diagram 600 illustrating peripheral operations according to one embodiment of the invention. The diagram 600 shows the interactions between the processing slice 310 and the peripheral unit 130. Although only one peripheral unit 130 is shown, it is contemplated that more than one peripheral units may operate with the processing slice 310.

Figure 7:
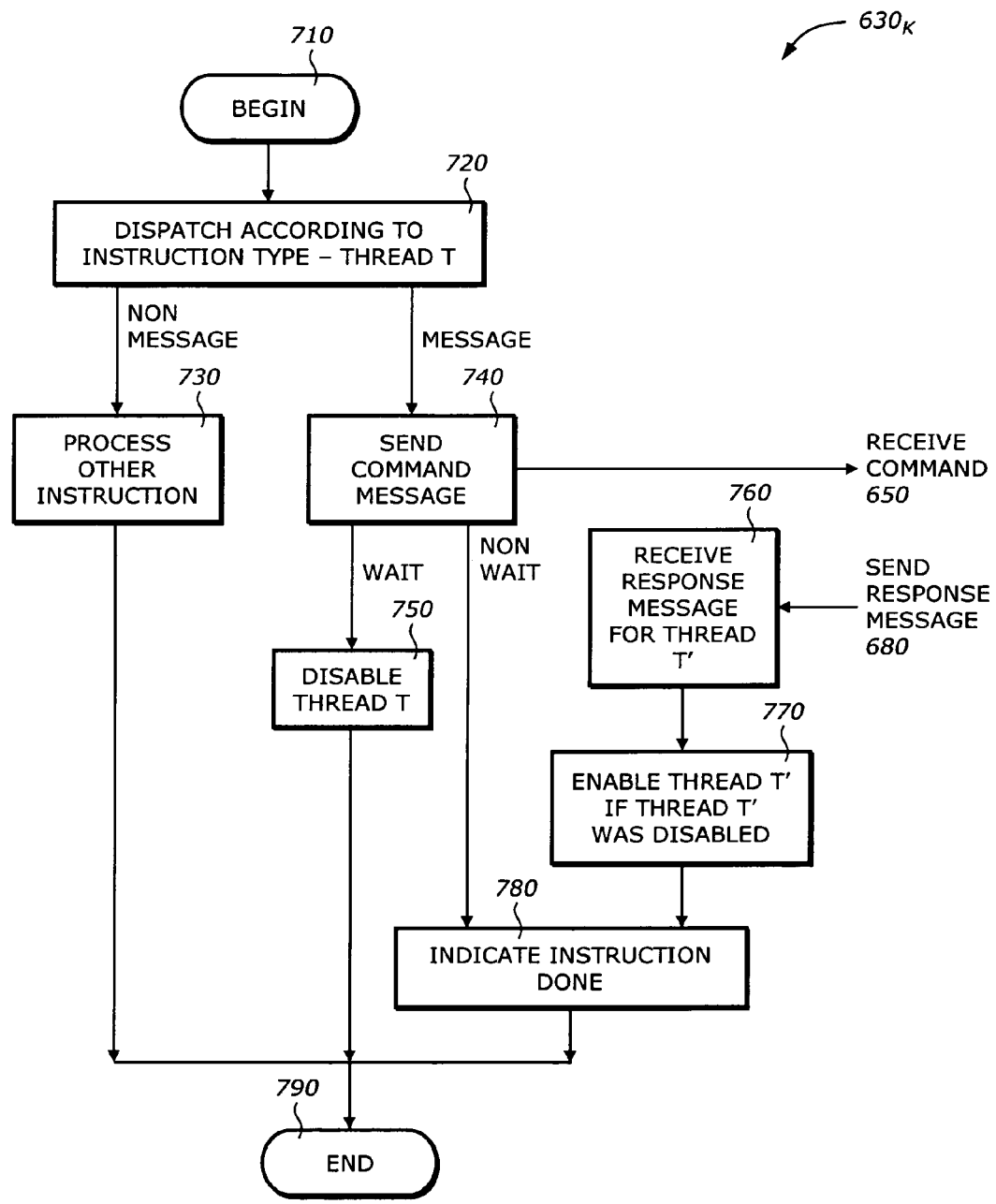
FIG. 7 is a diagram illustrating an instruction processing according to one embodiment of the invention.

Within the processing slice 310, the begin cycle 610 starts an instruction execution cycle. Block 620 selects one or more instructions for execution. One or more instructions may be selected for execution concurrently. Suppose K instructions are selected for execution. Block $630_1$ to Block $630_K$ process instruction 1 to instruction K, respectively. The details of the block $630_k$, where k=1, . . . , K, are shown in FIG. 7. Blocks $630_1$ to $630_K$ may terminate at the same time or at different times at the end cycle 640. Blocks $630_1$ to $630_K$ will interact with the peripheral unit 130 via the peripheral bus 260 via the peripheral bus 260 when they are processing message instructions.

Within the peripheral unit 130, there are processing blocks to receive and send peripheral messages via the peripheral bus 260. Block 650 receives the command message from the processing slice 310. Block 660 starts the I/O operation for the thread T as specified in the command message. Block 670 completes the I/O operation for thread T' where thread T' may or may not be the same as thread T. The command message for thread T' may have been received by block 650 either earlier or later than the command message for thread T, due to out-of-order performance of operations by the peripheral unit. Block 680 sends a response message to indicate the completion of thread T' to the processing slice via the peripheral bus 260.

FIG. 7 is a diagram illustrating the instruction processing block $630_k$ shown in FIG. 6 according to one embodiment of the invention. In this block, begin and end nodes 710 and 790, respectively, indicate the beginning and the end of the instruction processing block $630_k$.

Begin node 710 starts the instruction processing. Block 720 dispatches thread T according to the instruction type. If the instruction type is a non-message instruction, block 730 processes the instruction as appropriate. If the instruction is a message instruction, block 740 sends the command message to the peripheral unit 130. The command message is to be received by block 650 as shown in FIG. 6. If the command message is a wait instruction, block 750 disables thread T and goes to the end node 790. If the command message is a non-wait instruction, block 780 indicates that the instruction is done and goes to the end node 790.

Block 760 receives the response message for thread T' as sent from block 680 shown in FIG. 6. Then, block 770 enables thread T' if thread T' was disabled and then goes to block 780 to indicate that the instruction processing is done. Next, end node 790 indicates the end of the instruction processing block.

While one or more threads are waiting for completion of peripheral operations, other threads may continue executing instructions that utilize functional unit and memory resources. In this way, higher average performance of the multi-thread processors may be achieved.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a processing slice coupled to a peripheral bus to execute a plurality of threads comprising instructions, wherein the processing slice comprises:
   an instruction resource unit to perform a register operation specified in a first instruction dispatched from a first of the plurality of threads; and
   a peripheral unit interface to send a command message specifying a peripheral operation to a peripheral unit over the peripheral bus responsive to a second instruction dispatch from a second of the plurality of threads;
   wherein the instruction resource unit and peripheral unit interface execute the first and second instructions concurrently during a same clock cycle.

2. The apparatus of claim 1 wherein the peripheral unit is one of an input device and an output device.

3. The apparatus of claim 1 wherein the peripheral operation is one of an input operation and an output operation.

4. The apparatus of claim 1 wherein the command message includes at least one of a message content, a peripheral address identifying the peripheral unit, and a command code specifying the peripheral operation.

5. The apparatus of claim 1 wherein the peripheral unit sends a response message to the processing slice, the response message indicating the peripheral operation is completed.

6. The apparatus of claim 5 wherein the response message includes at least one of a thread identifier identifying the first thread, an operation result of the peripheral operation, a data register address specifying a data register in the processing slice to store the operation result, and a length indicator indicating length of the response message.

7. The apparatus of claim 6 wherein the peripheral bus comprises:
a bi-directional bus to transfer the command message from the processing slice to the peripheral unit and the response message from peripheral unit to the processing slice.

8. The apparatus of claim 1 wherein the processing slice disables the first thread after sending the command message if the command message is a wait instruction.

9. The apparatus of claim 1 wherein the first thread continues to execute after sending the command message if the command message is a non-wait instruction.

10. The apparatus of claim 8 wherein the processing slice enables the first thread after receiving the response message from the peripheral unit if the first thread was disabled.

11. The apparatus of claim 1 wherein the processing slice comprises:
an instruction processing unit to process instructions fetched from a program memory; and
a thread control unit coupled to the instruction processing unit to manage initiating and termination of at least one of the plurality of threads.

12. The apparatus of claim 11 wherein the processing slice further comprises:
a memory access unit coupled to the instruction processing unit to provide access to one of a plurality of data memories via a data memory switch, the memory access unit having a plurality of data base registers, each of the data base registers corresponding to each of the threads; and
a register file coupled to the instruction processing unit and a peripheral message unit having a plurality of data registers, each of the data registers corresponding to each of the threads.

13. The apparatus of claim 12 wherein the instruction processing unit comprises:
an instruction fetch unit to fetch the instructions from the program memory using a plurality of program counters, each program counter corresponding to each of the threads;
an instruction buffer coupled to the instruction fetch unit to hold the fetched instructions; and
an instruction decoder and dispatcher coupled to the instruction buffer to decode the instructions and dispatch the decoded instructions to one of the memory access unit, the instruction resource unit, and the peripheral unit.

14. A method comprising:
executing a plurality of threads comprising instructions in a processing slice, wherein the processing slice comprises:
an instruction resource unit to perform a register operation specified in a first instruction dispatched from a first of the plurality of threads; and
a peripheral unit interface to send a command message specifying a peripheral operation to a peripheral unit over a peripheral bus responsive to a second instruction dispatch from a second of the plurality of threads; and
executing the first and second instructions from the instruction resource unit and peripheral unit interface concurrently during a same clock cycle.

15. The method of claim 14 wherein the peripheral unit is one of an input device and an output device.

16. The method of claim 14 wherein the peripheral operation is one of an input operation and an output operation.

17. The method of claim 14 wherein the command message includes at least one of a message content, a peripheral address identifying the peripheral unit, and a command code specifying the peripheral operation.

18. The method of claim 14 wherein the peripheral unit sends a response message to the processing slice, the response message indicating the peripheral operation is completed.

19. The method of claim 18 wherein the response message includes at least one of a thread identifier identifying the first thread, an operation result of the peripheral operation, a data register address specifying a data register in the processing slice to store the operation result, and a length indicator indicating length of the response message.

20. The method of claim 19 further comprising:
transferring the command message from the processing slice to the peripheral unit and the response message from peripheral unit to the processing slice via a bi-directional bus.

21. The method of claim 14 wherein executing the plurality of threads comprises disabling the first thread after sending the command message if the command message is a wait instruction.

22. The method of claim 14 wherein executing the plurality of threads comprises continuing executing the first thread after sending the command message if the command message is a non-wait instruction.

23. The method of claim 21 wherein executing the plurality of threads comprises enabling the first thread after receiving the response message from the peripheral unit if the first thread was disabled.

24. The method of claim 14 wherein executing the plurality of threads comprises:
processing instructions fetched from a program memory by an instruction processing unit;
managing initiating and termination of at least one of the plurality of threads by a thread control unit.

25. The method of claim 24 wherein executing the plurality of threads further comprises:
accessing to one of a plurality of data memories by a memory access unit via a data memory switch, the memory access unit having a plurality of data base registers, each of the data base registers corresponding to each of the threads; and
storing data in a register file having a plurality of data registers, each of the data registers corresponding to each of the threads.

26. The method of claim 25 wherein processing instructions comprises:
fetching the instructions from the program memory using a plurality of program counters by an instruction fetch unit, each program counter corresponding to each of the threads;
holding the fetched instructions in an instruction buffer; and
decoding the instructions and dispatching the decoded instructions by an instruction decoder and dispatcher to one of the memory access unit, the instruction resource unit, and the peripheral unit.

27. A processing system comprising:
a plurality of banks of data memory;
a data memory switch coupled to the banks of data memory;
a program memory to store a program; and
a processing slice coupled to a peripheral bus to execute a plurality of threads comprising instructions, wherein the processing slice comprises:
an instruction resource unit to perform a register operation specified in a first instruction dispatched from a first of the plurality of threads; and
a peripheral unit interface to send a command message specifying a peripheral operation to a peripheral unit over the peripheral bus responsive to a second instruction dispatch from a second of the plurality of threads;
wherein the instruction resource unit and peripheral unit interface execute the first and second instructions concurrently during a same clock cycle.

28. The processing system of claim 27 wherein the peripheral unit is one of an input device and an output device.

29. The processing system of claim 27 wherein the peripheral operation is one of an input operation and an output operation.

30. The processing system of claim 27 wherein the command message includes at least one of a message content, a peripheral address identifying the peripheral unit, and a command code specifying the peripheral operation.

31. The processing system of claim 27 wherein the peripheral unit sends a response message to the processing slice, the response message indicating the peripheral operation is completed.

32. The processing system of claim 31 wherein the response message includes at least one of a thread identifier identifying the first thread, an operation result of the peripheral operation, a data register address specifying a data register in the processing slice to store the operation result, and a length indicator indicating length of the response message.

33. The processing system of claim 32 wherein the peripheral bus comprises:
a bi-directional bus to transfer the command message from the processing slice to the peripheral unit and the response message from peripheral unit to the processing slice.

34. The processing system of claim 27 wherein the processing slice disables the first thread after sending the command message if the command message is a wait instruction.

35. The processing system of claim 27 wherein the first thread continues to execute after sending the command message if the command message is a non-wait instruction.

36. The processing system of claim 34 wherein the processing slice enables the first thread after receiving the response message from the peripheral unit if the first thread was disabled.

37. The processing system of claim 27 wherein the processing slice comprises: an instruction processing unit to process instructions fetched from a program memory; and
a thread control unit coupled to the instruction processing unit to manage initiating and termination of at least one of the plurality of threads.

38. The processing system of claim 37 wherein the processing slice further comprises:
a memory access unit coupled to the instruction processing unit to provide access to one of the plurality of data memories via the data memory switch, the memory access unit having a plurality of database registers, each of the data base registers corresponding to each of the threads; and
a register file coupled to the instruction processing unit and a peripheral message unit having a plurality of data registers, each of the data registers corresponding to each of the threads.

39. The processing system of claim 38 wherein the instruction processing unit comprises:
an instruction fetch unit to; fetch the instructions from the program memory using a plurality of program counters; each program counter corresponding to each of the threads;
an instruction buffer coupled to the instruction fetch unit to hold the fetched instructions; and
an instruction decoder and dispatcher coupled to the instruction buffer to decode the instructions and dispatch the decoded instructions to one of the memory access unit, the instruction resource unit, and the peripheral unit.

40. A processing system comprising:
a plurality of multi-thread processors;
wherein each processor comprises a plurality of processing slices to execute a plurality of threads comprising instructions, wherein each processing slice comprises:
an instruction resource unit to perform a register operation specified in a first instruction dispatched from a first of the plurality of threads; and
a peripheral unit interface to send a command message specifying a peripheral operation to a peripheral unit over a peripheral bus responsive to a second instruction dispatch from a second of the plurality of threads;
wherein the instruction resource unit and peripheral unit interface execute the first and second instructions concurrently during a same clock cycle.

41. A processing system comprising:
a multi-thread processor having program base registers and data base registers;
wherein the processor comprises a plurality of processing slices to execute a plurality of threads comprising instructions, wherein each processing slice comprises:
an instruction resource unit to perform a register operation specified in a first instruction dispatched from a first of the plurality of threads; and
a peripheral unit interface to send a command message specifying a peripheral operation to a peripheral unit over a peripheral bus responsive to a second instruction dispatch from a second of the plurality of threads;
wherein the instruction resource unit and peripheral unit interface execute the first and second instructions concurrently during a same clock cycle.

* * * * *